United States Patent [19]

Bernhagen et al.

[11] Patent Number: 4,700,794
[45] Date of Patent: Oct. 20, 1987

[54] VEHICLE STEERING APPARATUS

[75] Inventors: James R. Bernhagen, Eldridge; Elmer R. Crabb, Davenport; Marilyn S. Murphy, Bettendorf, all of Iowa; Daniel G. Roley, Metamora, Ill.; Gene R. St. Germain, Clarendon Hills, Ill.; James H. Tunnell, Washington, Ill.

[73] Assignee: Caterpillar Inc., Peoria, Ill.

[21] Appl. No.: 885,342

[22] Filed: Jul. 14, 1986

[51] Int. Cl.[4] ............................................. B62D 11/18
[52] U.S. Cl. ....................................... 180/6.44; 60/444
[58] Field of Search ................ 180/6.44, 6.48; 60/444, 60/443

[56] References Cited

U.S. PATENT DOCUMENTS

| | | | |
|---|---|---|---|
| 3,349,860 | 10/1967 | Ross | 180/6.44 |
| 3,369,419 | 2/1968 | Henstrom et al. | 74/720.5 |
| 3,371,734 | 3/1968 | Zaunberger et al. | 180/6.44 |
| 3,477,225 | 11/1969 | Cryder | 60/19 |
| 3,543,515 | 12/1970 | Kempson | 60/443 |
| 3,620,319 | 11/1971 | Armasow et al. | 180/6.44 |
| 3,938,604 | 2/1976 | Kugler et al. | 180/6.44 |
| 4,085,812 | 4/1978 | Robinson et al. | 180/6.48 |
| 4,174,762 | 11/1979 | Hopkins | 180/6.44 |
| 4,434,680 | 3/1984 | Riediger | 74/682 |
| 4,458,485 | 7/1984 | Seelmann | 60/444 |
| 4,464,973 | 8/1984 | Rodler et al. | 180/6.44 |
| 4,541,497 | 9/1985 | Riediger | 180/6.44 |
| 4,599,855 | 7/1986 | Seelman | 60/444 |

Primary Examiner—John A. Pekar
Attorney, Agent, or Firm—Charles E. Lanchantin, Jr.

[57] ABSTRACT

An improved mechanical-over-hydraulic steering apparatus capable of providing automotive-type steering includes a steering wheel driven input control member, right and left turn control valves, and first and second actuators mounted for rotation along an axis common with the input control member. Each of the actuators has a cam operatively associated with a cam-following roller assembly that operates the respective control valve. The vehicle has a cross drive mechanism, and the steering apparatus includes an over-center variable displacement steering pump and associated displacement control controllably operated by first and second pilot lines connected to the right and left turn control valves. The steering pump controllably and bidirectionally communicates fluid to a steering motor for the steering input to the cross drive mechanism.

42 Claims, 8 Drawing Figures

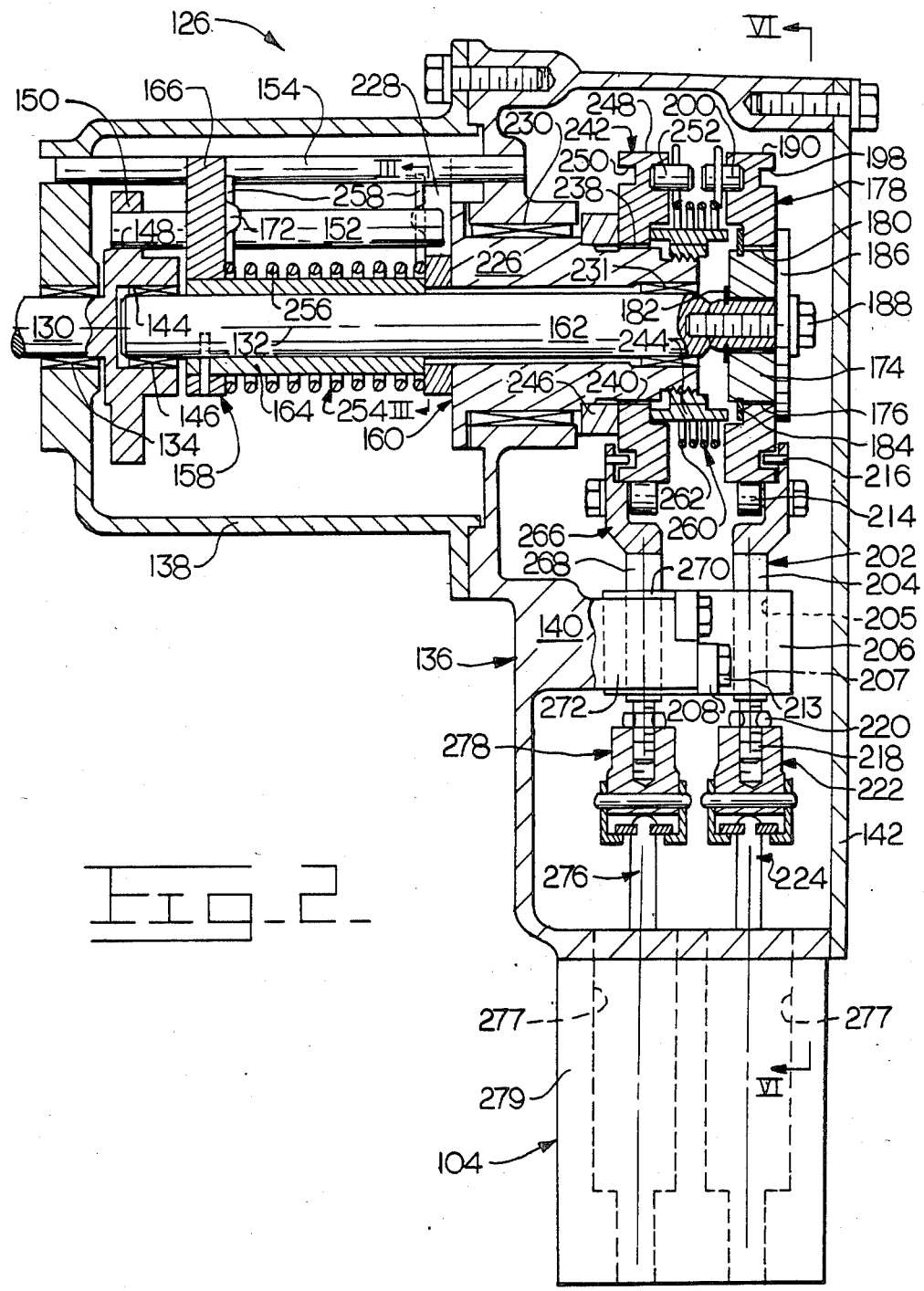
Fig_2_

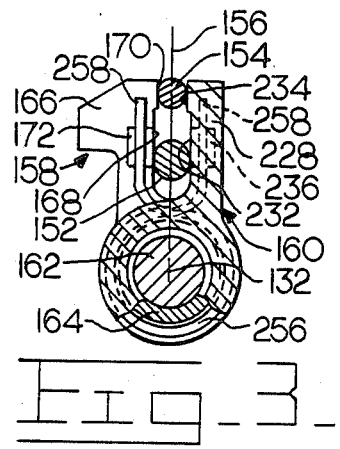
Fig_3_
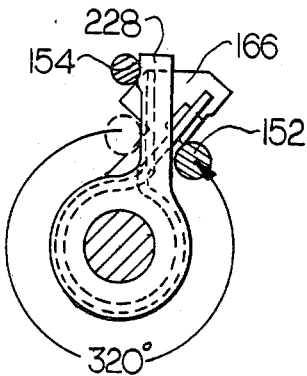
Fig_4_
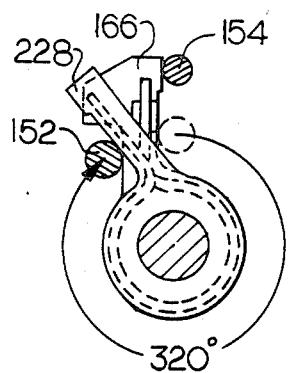
Fig_5_
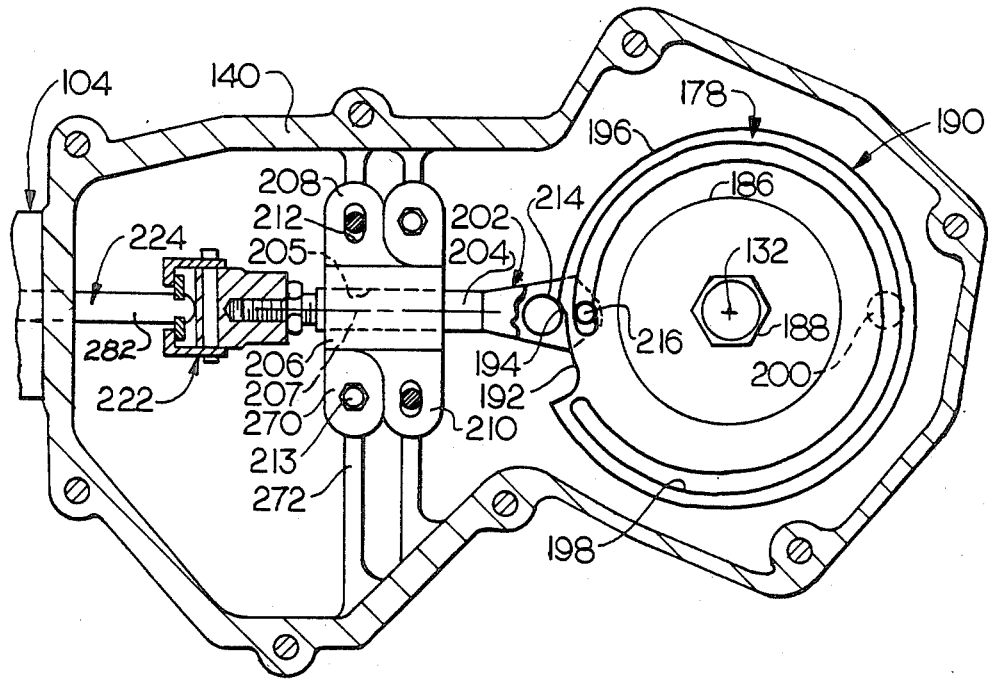
Fig_6_

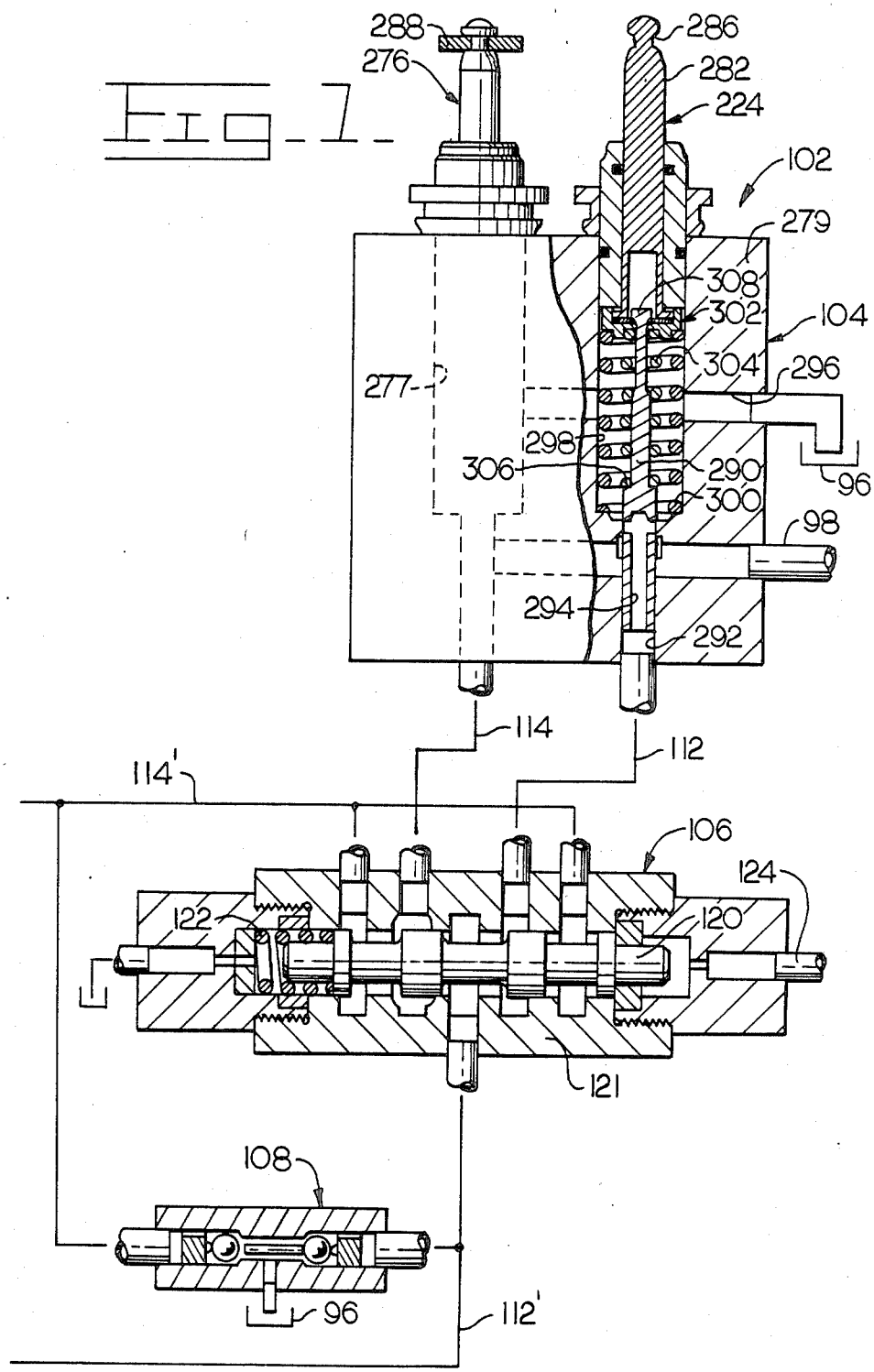

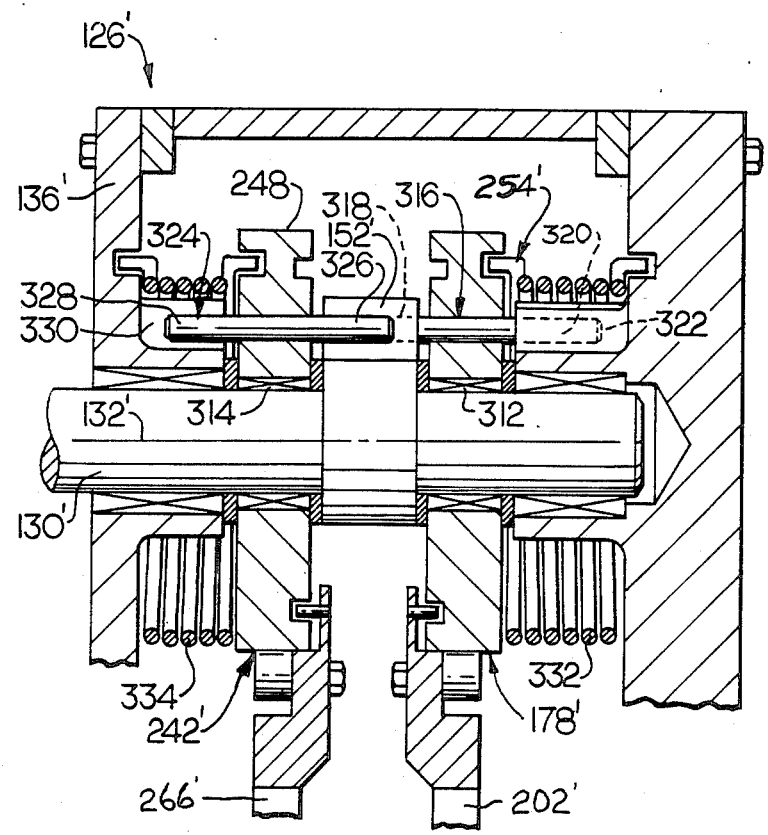
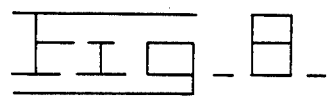

VEHICLE STEERING APPARATUS

TECHNICAL FIELD

This invention relates to a steering apparatus for controllably turning an earthmoving tractor, agricultural vehicle or the like, and more specifically to a mechanical-over-hydraulic powered vehicle steering apparatus having improved modulation over a particularly effective operating range.

BACKGROUND ART

Positive power flow from the engine to the opposite ground-engaging members of a vehicle during steering is particularly desirable over those systems that apply power to one side while interrupting the power flow to the other side and subsequently applying the service brake at the other side. Rather than providing duplicate pump and motors for each side of the vehicle and the relatively complex control systems associated therewith, it is also preferred that a single pump and a single motor be utilized for steering to reduce manufacturing and service costs.

U.S. Pat. No. 4,434,680 issued to C. W. Riediger, et al on Mar. 6, 1984 and U.S. Pat. No. 4,541,497 issued to C. W. Riediger, et al on Sept. 17, 1985, respectively illustrate a particularly effective planetary steering differential employing a single steering pump and single steering motor, and a mechanical-over-hydraulic control system for the operation thereof. Steering of the vehicle is achieved by manual manipulation of a tiller arm that is oriented in a generally transverse disposition forwardly of the left arm rest of the operator seat. One disadvantage of such an arrangement is that the operation of the tiller arm is different from the operation of the usual automative-type steering wheel. Another disadvantage of that arrangement is that the vehicle does not travel on the same path upon reversing the direction of movement of the vehicle during a turn. For example, should the vehicle be making a turn to the right while proceeding forwardly the vehicle will not travel over the same path if the vehicle is shifted into a reverse mode of operation, but rather will deviate therefrom since the vehicle continues to rotate about its own central vertical axis at substantially the same turning rate. That mode of operation has a number of advantages, but can be initially perplexing to those operators familiar with only automotive-type steering systems that traverse over the same path in reverse.

Still another feature of the steering control system shown in U.S. Pat. No. 4,541,497 is that it incorporates an open-loop hydraulic system between the steering pump and the steering motor along with a single steering selector spool to operate it. In other words, in that system, the steering pump furnishes fluid to the steering circuit and also to other circuits such as to an implement circuit. This is disadvantageous from the standpoint that a problem with the implement circuit, such as contamination by dirt during servicing thereof, could detrimentally affect operation of the steering system. In view of this, a fully dedicated steering system is considered desirable for increased reliability. This is especially so if the vehicle to be used is operated at faster ground speeds and on public highways or the like.

A fully dedicated steering system using a conventional over-center steering pump requires a reliable method of adjusting the pump displacement control. The pump displacement control is normally associated with adjusting the angle of the swash plate of the pump. This can be accomplished solely by a mechanical connection between the steering wheel and the pump displacement control, but it is difficult to provide the desired degree of response and sensitivity with a mechanical connection. For example, each connecting joint requires a certain amount of clearance which increases with wear, and this contributes to an undesirably large steering wheel deadband. Then there is the matter of obtaining the desired steering wheel modulation and force required to turn the steering wheel through its maximum turning stage.

Accordingly, what is needed is a simple, safe and reliable vehicle steering apparatus that will be responsive to the rotation of an input member such as a steering wheel to more effectively actuate the pump displacement control of an over-center steering pump through a hydraulic system. It is also desirable to avoid using high pressure and large flow valve assemblies because of the expense thereof and waste of energy. Such a steering apparatus must provide a mechanical force sufficient to automatically return the input control member to a straight ahead or centered position, a reasonable steering force range for the associated steering ratio, a relatively fast rate of response, and a relatively narrow steering wheel deadband at the centered position. Preferably, the steering apparatus should be compatible with a closed loop steering pump and motor system and provide torque in a single power path to a differential mechanism of the type providing powered turning to both sides. And still further, the steering apparatus should preferably provide an automotive-type of capability wherein when the transmission is shifted into a reverse mode of operation during a turn, the vehicle will travel over the same path as in forward.

The present invention is directed to overcoming one or more of the problems set forth above.

DISCLOSURE OF THE INVENTION

In accordance with one aspect of the invention, a steering apparatus for a vehicle having a steering input control member and a mechanism drivingly associated with left and right ground-engaging members includes a pump and motor system having a steering pump and associated displacement control for applying torque to the mechanism for steering it, a control valve group for controllably delivering pressure to the pump displacement control for operation thereof and including right and left turn control valves in juxtaposed relation, and a steering mechanism for converting the rotational movement of the input control member away from a centered position to linear actuation of one or the other of the control valves.

In accordance with another aspect of the invention, a vehicle steering apparatus for operation of a steering pump having a displacement control associated therewith includes an input control member rotatable about an axis in either direction away from a centered position, right and left turn control valves in fluid communication with the displacement control, first and second cams mounted for rotation about the axis and individually movable away from a neutral position in opposite directions, first means for rotating the first cam through a first angular range and the second cam through a second angular range in response to rotation of the input control member, and second means for converting the rotation of the cams to linear actuation of the control valves. Preferably, the angular ranges are individually greater than 180°, for example 320°, for increased sensitivity.

More specifically, the present invention features a steering mechanism responsive to an input control member directly actuated by a steering wheel and rotatably mounted along a central axis, a pair of actuators mounted for individual rotation about the axis oppositely away from a neutral position thereof and individually having a valve actuating cam thereon, and a pair of cam-following roller assemblies that are operatively associated with the cams and that respectively linearly operate a right turn control valve and a left turn control valve. Movement of the right and left turn control valves, which preferably are proportional pressure reducing valves, is effective to controllably deliver pressurized hydraulic fluid to a displacement control associated with an over-center, variable displacement steering pump. A steering motor hydraulically coupled to the steering pump through a closed-loop system subsequently delivers torque to a differential transmission for steering of the vehicle. Upon shifting of the transmission so that the direction of movement of the vehicle is reversed, a diverter valve is repositioned in such a way as to reverse the pressurized fluid being delivered to the pump displacement control. This is beneficial in that the vehicle will then travel in both directions over the same steering path like an automotive-type steering system.

BRIEF DESCRIPTION OF THE DRAWINGS

FIG. 2 is a diagrammatic and enlarged cross sectional view of the steering mechanism housing shown in FIG. 1 showing the advantageous construction of the steering mechanism.

FIG. 3 is a partial cross sectional view of the steering mechanism taken along line III—III of FIG. 2, with a portion broken away to better show details of construction thereof.

FIG. 4 is a view similar to FIG. 3 with the first actuator shown rotated 320° for maximum steering in one direction.

FIG. 5 is a view similar to FIGS. 3 and 4 with the second actuator shown rotated 320° for maximum steering in the other direction.

FIG. 6 is a side elevational view of the steering mechanism of FIG. 2 taken along line VI—VI thereof and showing the construction of a valve actuating cam and associated cam follower.

FIG. 7 is an enlarged diagrammatic view of a portion of the control valve group shown in FIG. 1 showing details of construction of the individual valves.

FIG. 8 is a diagrammatic cross sectional view of an alternate embodiment steering mechanism.

BEST MODE FOR CARRYING OUT THE INVENTION

Figure 1:
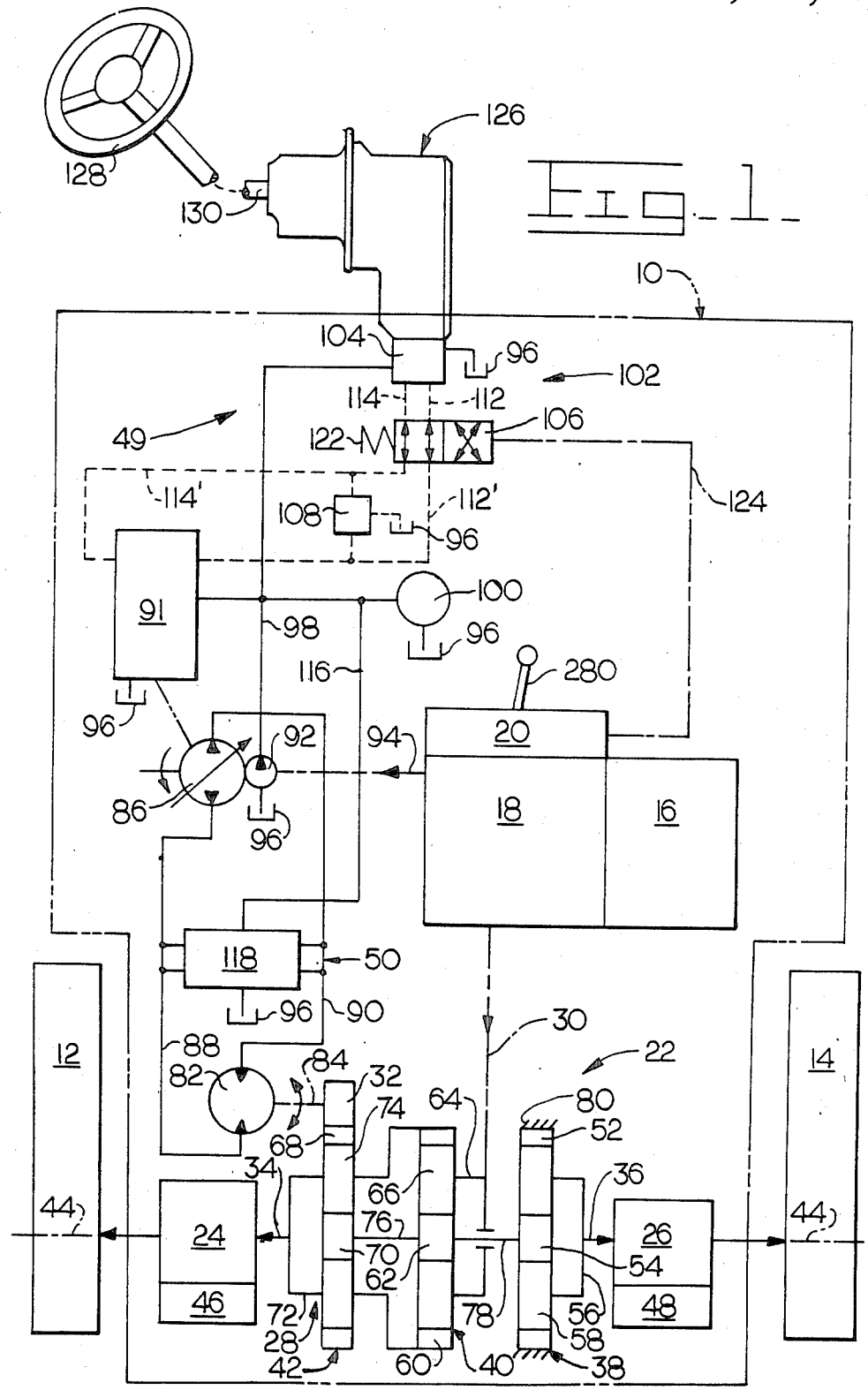
FIG. 1 is a diagrammatic plan view of a vehicle incorporating the steering apparatus of the present invention.

An earthmoving or agricultural work vehicle, as generally indicated by the reference number 10 in FIG. 1, includes a pair of ground-engaging members such as the pair of endless track chains or endless belts 12 and 14 diagrammatically shown for propelling it. The vehicle includes an engine 16, a reversible powershift transmission 18 driven by the engine and having an associated transmission control device 20, a cross drive mechanism or transaxle 22, and left and right final drives 24 and 26 respectively.

The cross drive mechanism 22 preferably employs a planetary steering differential 28 powerably driven by first and second input drive members 30 and 32, and having first and second output members 34 and 36 adapted to powerably drive the left and right final drives 24 and 26 respectively. The planetary steering differential 28 is shown in simplified block-like form and has first, second and third interconnected planetary gear trains 38, 40 and 42 respectively aligned along a central cross drive axis 44 oriented normal to the usual forward and reverse direction of vehicle travel. A left service brake 46 and right service brake 48 are associated with the respective final drives 24 and 26 so as to selectively stop movement of the endless belts 12 and 14 in the usual manner. During straight line movement of the vehicle 10, the first input drive member 30 is powerably driven by the powershift transmission 18 at one of a plurality of forward speeds or reverse speeds. A steering apparatus 49 constructed in accordance with the present invention is operatively associated with a pump and motor system 50 for controllably and bidirectionally applying torque to the second input drive member 32 for steering the vehicle 10, or for holding the input member 32 stationary for straight line movement thereof as will be subsequently explained.

More specifically, however, the first planetary gear train 38 of the planetary steering differential 28 includes a first ring gear 52, a first sun gear 54, a first planet carrier 56 and a plurality of first planet gears 58 rotatably mounted on the carrier and in engagement with the ring and sun gears. The second planetary gear train 40 has a second ring gear 60, a second sun gear 62, a second planet carrier 64 and a plurality of second planet gears 66. Similarly, the third planetary gear train 42 has a third ring gear 68, a third sun gear 70, a third planet carrier 72 and a plurality of third planet gears 74. In the embodiment illustrated the first input member 30 is connected to rotatably drive the second planet carrier 64. Since the first, second and third sun gears 54,62 and 70 are also connected for joint rotation via intermediate shaft elements 76 and 78, and the first ring gear 52 is continuously held stationary with respect to a housing 80, the second ring gear 60 and the second sun gear 62 are caused to be powerably rotated. The second ring gear 60 is connected to rotate jointly with the third planet carrier 72 and with the left output member 34, and the first planet carrier 56 is connected to rotate with the right output member 36.

If straight ahead operation is desired, the pump and motor system 50 is actuated sufficient to hold a conventional, fixed displacement hydraulic steering motor 82 an its operatively associated output shaft 84 and second input member 32 stationary. Input member 32 can be a spur gear in intermeshing toothed engagement with the outer periphery of the third ring gear 68, so that this is effective to hold the third ring gear stationary. Under these conditions, the left and right differential output members 34 and 36 are simultaneously driven in the same dirction, at the same speed, and at equal levels of torque.

If a steering correction is desired, the steering motor 82, shaft 84 and second input member 32 are rotated in the selected direction at the desired speed to cause the third ring gear 68 to rotate correspondingly. This causes the left output member 34 to increase in speed the same relative amount as the right output member 36 decreases in speed or vice versa to result in a turning motion.

The pump and motor system 50 further includes a conventional, over-center, variable displacement hydraulic steering pump 86 hydraulically coupled to the steering motor 82 through a pair of hydraulic lines 88 and 90. The steering pump is preferably of the axial piston type having a pump displacement control 91 operatively associated with a control element normally constituted by a pump swash plate or wobble plate, not shown. Preferably also, the steering pump has proportional hydraulic control and pressure cut off capabilities, and is of the type commercially offered by Linde Aktiengesellschaft of Aschaffenburg, West Germany. The steering pump 86 and an associated charging pump 92 are mechanically driven by the engine and/or transmission through an intermediate drive train 94 which is schematically illustrated. The charging pump 92 draws in hydraulic fluid from a reservoir or tank 96 and delivers it to a distribution conduit or manifold 98 at a controlled pressure of about 2,705 kPa (400 psi) as dictated by a conventional pressure relief valve 100. From the manifold 98 fluid pressure is directed to the pump displacement control 91 and to a control valve group 102 forming a portion of the steering apparatus 49 and including a pilot valve assembly 104, a diverter valve 106, and a shuttle dump valve 108. These valves are shown in greater detail in FIG. 7. First and second pilot lines 112 and 114 which are shown in broken lines in FIG. 1 extend between the pilot valve assembly 104 and the pump displacement control 91 for the controlled operation thereof. The over-center steering pump 86, or more specifically the pump displacement control 91 therefor, is responsive to relatively moderate levels of pressure in the first or second pilot lines for delivering hydraulic fluid at relatively high pressure levels to the steering motor 82 via the lines 88 and 90. Another branch line or conduct 116 extends from the manifold 98 to a conventional make-up valve and relief valve assembly 118 cross-connected between the high pressure lines 88 and 90.

The diverter valve or flip-flop valve 106 is connected to the pilot lines 112 and 114. The diverter valve has a first position as illustrated in FIGS. 1 and 7 corresponding to a forward mode of operation of the vehicle wherein the pilot lines 112 and 114 are directly coupled to pilot lines 112' and 114' respectively. The diverter valve includes a diverter valve spool 120 which is mounted within a suitably apertured valve body 121 and biased to the first or rightward position by a spring 122. In a second position corresponding to a reverse mode of operation the diverter valve spool is moved to the left from the position illustrated against the reaction of the spring 122 by a preselected pressure level available at the right end thereof when viewing the drawings. For example, when 2,750 kPa (400 psi) is available in a signal passage 124 shown in phantom lines in FIG. 1 and extending between the diverter valve and the transmission control device 20, then the spool is moved fully to the left such that the pilot line 112 is in fluid communication with line 114' and the pilot line 114 is in fluid communication with line 112'. Thus it can be recognized that the diverter valve is essentially a pilot operated directional control valve of conventional construction and need not be described further in detail.

The shuttle dump valve 108 is also of conventional construction and can be considered optional. It is coupled between the pilot lines 112' and 114' near to the pump displacement control 91 to allow a more direct route of the return fluid to the tank 96 from the depressurized pilot line than through the pilot valve assembly 104. When one of the pilot lines 112' and 114' is pressurized, the other pilot line is immediately opened to the tank through the shuttle dump valve for a faster rate of response.

Advantageously, the steering apparatus 49 shown in FIG. 1 also includes a steering means or steering mechanism 126 for mechanically converting the rotational movement of a steering wheel 128 to linear actuation of the pilot valve assembly 104 with the desired degree of modulation. The steering wheel has a neutral position corresponding to straight movement of the vehicle, and can be rotated through a first angular range for turning the vehicle to the left or through a similar second angular range for turning the vehicle to the right. Preferably, the sum of the first and second angular ranges is greater than 360°. In the instant embodiment, each angular range is approximately 320° for increased sensitivity.

As best shown in FIG. 2, the steering mechanism 126 is responsive to the rotation of an input control member 130 about a central axis 132. The input control member is directly responsive to rotation of the steering wheel 128 and is rotatably supported by a bearing 134 in a housing assembly 136 including a tubular portion 138, a case portion 140 and a cover 142 releasably connected together by the usual fasteners. A blind cylindrical pocket 144 is defined within the input control member 130 along the axis for receiving a bearing 146, and a cylindrical bore 148 is defined in a radially outwardly extending portion 150 thereof for receiving a cylindrical actuating member or dowel 152 so that the actuating member extends generally inwardly within the tubular portion 138 in parallel relation to the central axis. In the neutral position of the input member illustrated in FIG. 2 a limiting stop member or dowel 154 is supported between the tubular portion 138 and case portion 140 in parallel relation to the central axis and in a common neutral plane 156 with the actuating member 152 as can be appreciated by reference to the sectional view of FIG. 3.

Rotational movement of the actuating member 152 of the input member 130 in a counterclockwise direction when viewing FIG. 3 is effective to correspondingly rotate a first actuator 158, and in a clockwise direction is effective to similarly rotate a second actuator 160. As shown in FIG. 2, the first actuator 158 includes an elongate cylindrical shaft 162 supported along the axis 132 at the input end by the bearing 146. A cylindrical tube or sleeve 164 is releasably secured to the shaft and a first arm 166 extends radially outwardly from the tube at the input end of the shaft. The arm 166 also defines radially inner and outer seats 168 and 170 respectively, and a pair of juxtaposed spring-anchoring tabs 172 as shown in FIG. 3.

The first actuator 158 also includes a hub 174 having a plurality of relatively fine external serrations 176 releasably and non-rotatably connected to the output end of the shaft 162, and an annular valve actuating cam 178 releasably connected to the hub by a corresponding plurality of internal serrations 180. A radially inner retaining ring 182 serves as a stop to limit inward movement of the hub on the shaft, and a radially outer retaining ring 184 correpondingly limits inward movement of the actuating cam on the hub. A plate 186 is releasably secured to the end of the shaft by a fastener 188 screwthreadably received therein to limit axially outward movement thereof and to generally hold them in an axially fixed position.

Referring now to both FIGS. 2 and 6, the first valve actuating cam 178 may be noted to define a peripheral, radially outwardly facing cam surface 190 with an inactive portion 192, a relatively short starting ramp portion 194, and a gradually radially outwardly extending operating ramp portion 196. An axially outwardly facing spiral groove 198 is defined in the actuating cam at a generally fixed radial distance inwardly of the cam surface, and a spring-anchoring dowel 200 extends axially inwardly from the cam.

A cam-following roller assembly 202 having a cylindrical shaft portion 204 is supported for reciprocal movement within a cylindrical bore 205 of a sleeve bearing portion of a pillow block 206 such that a central axis 207 thereof substantially intersects the cam axis 132. The pillow block has first and second feet 208 and 210 at the diagonally opposite sides thereof that define transversely elongate slots 212 therein. A threaded fastener or bolt 213 extends through each of the slots and is screwthreadably received in the case portion 140 to allow adjustment thereof as will be subsequently explained. A cylindrical cam-following roller 214 and a retracting dowel 216 are connected to one end of the shaft portion 204 in general alignment with the axis 207, and the other end of the shaft portion has a threaded end member 218 and a locking nut 220 for being releasably and adjustably connected to a coupling assembly 222. In turn, the coupling assembly is releasably secured to a right turn control valve 224. This control valve is preferably a proportional pressure reducing valve as is illustrated in FIG. 7, and forms a major portion of the pilot valve assembly 104.

As best shown in FIG. 2, the second actuator 160 includes a stepped tubular shaft 226 having a second arm 228 rigidly secured thereto which is rotatably supported within the housing assembly 136 by a bearing 230. Another bearing 231 supports the distal end of the inner shaft 162 within the tubular shaft 226. Like the opposing first arm 166, the second arm 228 defines inner and outer seats 232 and 234 respectively, and spring-anchoring tabs 236 as is illustrated in FIG. 3. The tubular shaft 226 defines a plurality of relatively fine external serrations 238 for receiving the internal serrations 240 of a second valve actuating cam 242 which basically has the same profile as the first valve actuating cam 178 only turned around since it functions from the opposite directional sense. A conventional lockable, internally threaded spanner nut 244 is screwthreadably received on the end of the tubular shaft 226 and is used to hold the second valve actuating cam 242 axially against a spacer ring 246 and thus in a fixed position on the tubular shaft. Although not illustrated in detail, the second valve actuating cam has a cam surface 248 like the cam surface 190 and a groove 250 like the groove 198 of the other actuating cam 178. Also, a spring anchoring dowel 252 is secured thereto.

As shown in FIG. 2 and 3, the steering mechanism 126 includes first resilient means 254 for rotationally biasing the first and second arms 166 and 228 of the first and second actuators 158 and 160 towards the stationary stop member 154. Since the actuating member 152 of the input control member 130 is trapped between the arms the steering wheel 128 is also urged towards its centered and neutral position. Particularly, the first resilient means includes a first torsion spring 256 with approximately 22.4 left hand coils with a 360° rating of 1.58 newtons meters. The opposite radially outwardly extending ends 258 of the torsion spring are anchored between the tabs 172 and 236 on the respective arms, while the major portion thereof encircles the tube 164.

A redundant second resilient means 260 is also provided for reasons of safety for rotationally biasing the first and second valve actuating cams 178 and 242 in opposing rotational directions and thus the input actuating member 152 and the steering wheel 128 towards a neutral position. Specifically, the second resilient means includes a second torsion spring 262 with approximately 7.4 right hand coils with a 360° rating of 0.48 newton meters. Should the primary torsion spring 256 fail in use, the secondary torsion spring 262 would also serve to return the steering wheel 128 to neutral. Moreover, since the secondary torsion spring is substantially lighter in capacity, the operator of the vehicle 10 would note a substantial decrease in the manual effort required to turn the steering wheel so that it would indicate a failure of the spring 256 to him.

The second valve actuating cam 242 is operatively associated with a second cam-following roller assembly 266 having a cylindrical shaft 268 supported for axial movement within another pillow block 270. The pillow block 270 is identical to the pillow block 206 but is reversed so that the diagonal feet 208 and 210 thereof can be releasably secured to an appropriately stepped mounting pedestal 272 defined on the case portion 140 by the fasteners 213 as can be noted by reference to FIGS. 2 and 6. The second cam-following roller assembly 266 is operatively connected to a left turn control valve 276 through a coupling assembly 278 identical to the coupling assembly 222. Both of the control valves 224 and 276 are identical in construction and are desirably juxtaposed in parallel relation within a pair of stepped cylindrical bores 277 defined in a common valve body 279. As representatively illustrated by the right turn control valve 224 in FIG. 7, each of the control valves includes a depressible actuating plunger 282 with an annular groove 286 formed in the outer end thereof for receiving a releasable retainer ring 288. Each of the control valves has a control spool 290 which is reciprocally movable in a smaller diameter cylindrical bore 292 of the stepped cylindrical bore 277. The control spool defines internal passages 294 therein which are normally unpressurized by being in open communication with a return passage 296 to the reservoir 96 through a larger diameter cylindrical spring chamber 298. A first coiled compression spring 300 acts between the valve body 279 and a retainer assembly 302 to urge the spool and plunger to such position, or in the upward direction when viewing FIG. 7. A second coiled compression spring 304 is disposed within the first spring and extends between the retainer assembly and an annular seat 306 formed on the spool to urge the spool downwardly when viewing FIG. 7 so that an enlarged head portion 308 on the spool is intimately seated against the retainer assembly 302. When the plunger 282 is depressed the spool is urged downwardly to cut off communication between the return passage 296 and the internal passages 294 within the spool, and to controllably open the internal passages to the pressurized manifold 98 and to achieve a reduced pressure in the pilot control line 112. Depression of the plunger of the left turn control valve 276 will in a similar manner result in controlled pressurization of the pilot line 114. In the instant embodiment, the pressure in the pilot control lines is directly proportional to the axially inward displacement of the individual plungers 282.

ALTERNATE EMBODIMENT

FIG. 8 illustrates a second embodiment steering mechanism 126' which is somewhat simpler and more compact than the steering mechanism 126 described above. Parts common in function with those of the first embodiment are identified by the same reference number, but with a prime indicator appended thereto.

The steering mechanism 126' includes an input control member or shaft 130' mounted within a housing assembly 136' for rotation about a central axis 132'. An actuating member 152' extend radially outwardly from the control member in parallel relation to the axis, and first and second needle bearing assemblies 312 and 314 are mounted on the control member at either side of the centrally disposed actuating member. A first valve actuating cam 178' is mounted on the bearing assembly 312 and a second valve actuating cam 242' is mounted on the bearing assembly 314, and each of these actuating cams has a profile similar to cam surface 190 described previously with respect to FIG. 6. An arm or dowel 316 is secured to rotate with the actuating cam 178' and is oriented parallel to the central axis such that an axially inner end 318 thereof is in abutment at the side with the far side face of the actuating member 152' in the neutral or straight-ahead position of the vehicle 10. An axially outer end 320 thereof is simultaneously in abutment at the same side with a limiting stop member or face 322 defined on the housing assembly 136'. In a corresponding manner the other actuating cam 242' also has an arm or dowel 324 secured thereto and having an axially inner end 326 in abutment with the near side face of the actuating member 152' and an axially outer end 328 in abutment with a limiting stop member or face 330 of the housing assembly at the same side thereof.

In this alternate embodiment the resilient means 254' for rotationally biasing the actuating cams 178' and 242' to the neutral state against the respective limiting stop members 322 and 330 includes a first torsion spring 332 coupled between the housing assembly 136' and the first valve actuating cam 178' and a second torsion spring 334 coupled between the housing assembly and the second valve actuating cam 242'. Looking along the central axis 132' from the right side of FIG. 8, the first torsion spring 332 will continually urge the actuating cam 178' in a counterclockwise direction while the second torsion spring 334 will continually urge the actuating cam 242' in a clockwise direction. This resilient biasing force will also serve to center the input control member 130' and the steering wheel 128 connected thereto.

Although not fully illustrated in the fragmentary view of FIG. 8, it is to be understood that the actuating cams 178' and 242' would individually operate to depress right turn and left turn control valves 224 and 276 disposed normal thereto preferably through cam-following roller assemblies 202' and 266' and coupling assemblies 222 and 278 of the type described earlier.

INDUSTRIAL APPLICABILITY

In the operation of the first embodiment, when there is no force on the steering wheel 128, the torsion spring members 256 and 262 will urge the actuators 158 and 160 of FIGS. 2 and 3 in opposing directions such that the arm seats 170 and 234 are rotatably against the limiting stop member 154 to achieve a neutral condition thereof. Such movement of the actuators and their respective arms 166 and 228 will simultaneously bias the actuating member 152, the input control member 130 and the steering wheel rotatably back to a neutral or straight ahead steering position. The valve actuating cams 178 and 242 will be in the position substantially illustrated in FIG. 6 with the cam following rollers 214 thereof being disposed at the beginning of the starting ramp portions 194.

With the cam-following roller assemblies 202 and 266 not yet being moved by the valve actuating cams 178 and 242, the plungers 282 of the right and left turn control valves shown in FIG. 7 are not depressed. In such mode, the pilot lines 112 and 114 are unpressurized and the conventional pump displacement control 91 of FIG. 1 is so positioned as to prevent fluid flow in the lines 88 and 90 connecting the steering pump 86 to the steering motor 82. This serves to hold the second input drive member 32 of the planetary steering differential 28 stationary so that movement of the vehicle 10 is limited to straight operation.

In regard to the starting point of the rollers 214 on the starting ramp portions 194, it is to be noted that there are three steps in initially adjusting the steering mechanism 126. Firstly, the cams 178 and 242 can be rotated with respect to shafts 162 and 226, and inserted axially onto their respective serrations 176/180 and 238/240. This provides an initial indexing with a relatively fine degree of annular adjustment so that the axes 207 of the cam-following roller assemblies 202 an 266 and the rollers 214 will be aligned precisely between the inactive portions 192 and the starting ramp portions 194. Secondly, the bolts 213 associated with the pillow blocks 206 and 270 are loosened to enable the pillow blocks to be moved transversely because of the elongate slots 212. Pillow block 206 can be noted to be capable of movement in the vertical direction when viewing FIG. 6, for example, and this will allow the roller 214 to be positioned precisely on the edge of the starting ramp portion 194. Thirdly, the coupling assemblies 222 and 278 are adjusted for the proper length along the axes 207. Particularly, pressure readings of zero should be obtained in the pilot lines 112 and 114 leading from pilot valve assembly 104 with the rollers at the edge of the starting ramp portions. The input member 130 is then rotated a preselected small angle, for example about 3°, whereupon it is desired that an initial preselected pressure level of about 400 kPa (60 psi) be present in the pilot lines. If the obtained pressure reading is below such level in either of the pilot lines 112 and 114, then the coupling assembly associated with the respective pressure reducing control valve 224 and 276 is adjusted to increase its axial length in a direction to move the control valve inwardly into the pilot valve assembly 104 until such desired pressure is provided.

Assuming that a right turn of the vehicle is desired, and the above initial adjustments have been made, the input control member 130 and associated actuating member 152 are rotated in a counterclockwise direction away from the position illustrated in FIG. 3 and toward the maximum steering position illustrated in FIG. 4. The actuating member 152 acts against the inner seat 168 of the first arm 166 and against the resilient and increasing loading of both the primary torsion spring 256 and the secondary torsion spring 262 shown in FIG. 2. These springs serve to bias the outer seat 234 of the second arm 228 against the limiting stop member 154 so that the second actuator 160 remains inactive while the first actuator 158 is active. With the counterclockwise rotation of the first arm 166 and associated shaft 162 the first valve actuating cam 178 is similarly rotated. The roller 214 travels immediately up the starting ramp portion 194 and along the operating ramp portion 196 of the cam surface 190 and the roller assembly 202 is urged gradually to the left when viewing FIG. 6 in a direction to push the plunger 282 of the right turn control valve 224 into the pilot valve assembly 104. As the plunger is initially moved downwardly when viewing FIG. 7, the inner compression spring 304 acts against the control spool 290 to urge it downwardly and break off communication between the internal passages 294 of the control spool and the unpressurized spring chamber 298 which is always in open communication with the return passage 296. The pressure available in the manifold 98 is subsequently metered by the internal passages of the control spool to the pilot line 112. The operating ramp portion 196 is effective to urge the control valve inwardly a total distance of about 9.7 mm (0.38") in the present embodiment, with the maximum displacement being equivalent to about 1600 kPa (230 psi) in the pilot line 12. It is to be understood that the control valve 224 can be of a wide variety of conventional constructions just so that it receives the fixed pressure in the manifold 98 and provides a reduced pressure to the pilot line 112 as a function of the linear position of a control element thereof such as the plunger 286. Moreover, the profile of the cam surface 190 can be modified to depress the plunger at a faster rate near the neutral position, for example, if desired.

Preferably, the pressure in the pilot line 112 increases in direct proportion to the inward displacement of the right turn control valve 224 and acts on the pump displacement control 91. The pump displacement control is also connected to the source of pressurized fluid at about 2,750 kPa (400 psi) in the manifold 98. The angle of the usual swash plate of the steering pump 86 is directly controlled as a function of the pressure in the pilot line by a conventional internal servo and actuator system although not illustrated here. The steering pump is in fluid communication with the steering motor 82 through the pressurized line 88 and unpressurized return line 90, so that the steering motor shaft 84 rotates the second input member or gear 32 at the desired rate and direction. The first input member 30 the cross drive mechanism 22 is simultaneously being driven by the transmission 18 at the selected speed rate, and the rotation of the second input member 32 is such as to cause the left output member 34 to increase in speed as much as the right output member 36 decreases in speed so that the vehicle will turn to the right by virtue of the action of the cooperating elements of the planetary steering differential 28. As the planetary steering differential is fully described in U.S. Pat. No. 4,434,680 mentioned earlier, such description need not be repeated here, but is incorporated fully herein by reference.

Upon releasing the manual force on the steering wheel 128, the torsion springs 256 and 262 will return the first actuator 158 in a clockwise direction back to the position of abutment of the first arm 166 against stop member 154. The spring 300 inside of the right turn control valve 224 will urge the cam-following roller assembly 202 outwardly against the cam. However, under adverse operating conditions such as extremely cold weather, the force exerted by that internal spring may not be enough to overcome sliding friction of the shaft portion 204 in the pillow block 206. Hence, the retracting dowel 216 serves as a more positive secondary system to keep the roller 214 in juxtaposed relation to the cam surface 190 during such return to neutral.

A left turn is achieved in substantially the same manner as a right turn, with the input actuating member 152 being rotated in a clockwise direction rather than a counterclockwise direction as can be visualized by comparing FIGS. 3, 4, and 5. In such instance, the first actuator 158 remains inactive and the second actuator 160 becomes active, whereupon the second valve actuating cam 242 linearly moves the second cam-following roller assembly 266 and the left turn control valve 276 inwardly into the pilot valve assembly 104. Pressure is then controllably delivered to the second pilot line 114 by the pressure reducing control valve 276 for operation of the pump displacement control 91 so as to reverse the direction of rotation of the steering pump 86, steering motor 82, and steering gear 32. Rotation of the gear 32 in the opposite directon will cause the left output member 34 to decrease in speed and the right output member 36 to increase in speed the same relative amount to effect a left turn.

If during a left turn, the transmission 18 is shifted by the operator from a forward mode to a reverse mode of operation, the steering apparatus 49 effectively reverses the pressurization line and the unpressurized return line to the pump displacement control 91. For example, the diverter valve 106 is axially located to the left of the positions shown in FIGS. 1 and 7 because signal passage 124 is pressurized to a preselected level whenever a reverse mode of operation is selected. It is contemplated that the diverter valve can alternatively be mechanically positioned to the left as a function of the movement of the transmission control lever 280 to reverse, and be mechanically positioned to the right when the transmission control lever is moved to forward by a suitable linkage mechanism, although not shown. In either event, the action is such as to cross connect the lines 112 and 114' and 114 and 112' in the reverse mode of operation so that the pump displacement control 91, the steering pump 86, the steering motor 82 and associated second input member 32 will be driven in a reverse operational sense. This enables the vehicle to travel over a reverse route identical to the forward route during a particular turn condition.

Should the primary torsion spring 256 break or fail, the secondary torsion spring 262 will continue to bias the actuators 158 and 160 and the steering wheel 128 toward neutral, but at a lesser force level. The operator would immediately observe that the torque necessary to rotate the steering wheel would be abruptly lowered, and so would be at the very least aware that some problem or failure of the resilient return means had occurred.

It can therefor be appreciated that the vehicle steering apparatus 49 of the present invention is simple, rugged and reliable in its construction, and yet is responsive to rotation of the input control member 130 about a central axis 132 to more effectively actuate a pair of control valves 224,276 located at a substantially 90° relationship to the axis. Proportionately pressurized pilot lines 112,114 at a relatively low pressure communicate the control valves with the displacement control 91 of a single over-center variable displacement steering pump 86 for the controlled operation thereof. The steering motor 82 hydraulically coupled to the steering pump is then effective to provide steering torque to the cross drive mechanism 22 in a single power path in superimposed relation to the torque delivered thereto by the transmission 18. The steering mechanism 126 is responsive to the rotation of the steering wheel for selectively rotating one of the actuators 158 and 160 and associated cams 178 and 242 through an individual angular range of operation in excess of 180° for increased sensitivity of control of the axial movement of the pressure-reducing control valves 224 and 276. As is illustrated and described, the individual angular range preferred is about 320° to allow about 1.78 full turns of the steering wheel to obtain the desired steering wheel turning response between the maximum steering positions. Moreover, the steering wheel deadband, or amount of steering wheel rotation away from the centered position before the vehicle starts to turn, is particularly narrow, being less than about 8° in each direction. The steering wheel force, defined as the force tangential to the steering wheel 128 required to turn it, can be expected to vary from an initial value of about 0.9 kg (2.0 lb) to about 2.5 Kg (5.5 lb) maximum at full steer. The time required for the steering apparatus 49 to begin to respond to a steering input can be expected to be less than 0.75 seconds under adverse cold oil conditions and less than 0.20 seconds with normal warm oil conditions. Lastly, the steering apparatus 49 can effect a generally automotive-type steering response for any wheeled or tracked vehicle employing a steerable differential or cross drive mechanism utilizing a single steering input torque path thereto.

Other aspects, objects, and advantages of this invention can be obtained from a study of the drawings, disclosure, and the appended claims.

We claim:

1. A vehicle steering apparatus for a vehicle having a steering input control member rotatable about a central axis and a mechanism drivingly connected to left and right ground-engaging members, comprising:
   pump and motor means for controllably applying torque to the mechanism for steering the vehicle and including a steering pump and a displacement control for the steering pump;
   control valve means for controllably delivering fluid under pressure to the displacement control, the control valve means including a right turn control valve and a left turn control valve in juxtaposed relation; and
   steering means for converting the rotational movement of the input control member away from a centered position to linear actuation of a selected one of the control valves, the steering means including a first actuator mounted for rotation about the central axis and operatively connected to the right turn control valve and a second actuator mounted for rotation about the central axis and operatively connected to the left turn control valve.

2. The vehicle steering apparatus of claim 1 wherein the steering means includes means for resiliently biasing the input control member to a centered neutral position.

3. The vehicle steering apparatus of claim 2 wherein the input control member is connected to rotate directly with a steering wheel.

4. The vehicle steering apparatus of claim 1 wherein the first actuator includes a first valve actuating cam and the second actuator includes a second valve actuating cam.

5. The vehicle steering apparatus of claim 4 wherein the steering means includes first and second cam-following roller assemblies operatively engaging the first and second valve actuating cams and individually connected to the respective control valves.

6. The vehicle steering apparatus of claim 5 wherein the steering means includes means for rotating the first actuator in a first direction through a first angular range and the second actuator in a second direction through a second angular range in response to corresponding rotation of the input control member, the sum of the first and second angular ranges being greater than 360° for increased sensitivity.

7. The vehicle steering apparatus of claim 1 wherein the first actuator and the second actuator are individually rotatable about the control axis away from a neutral position in different directions in response to rotation of the input control member.

8. The vehicle steering apparatus of claim 7 wherein steering means is so constructed and arranged that the input control member can be moved through first and second angular ranges individually greater than 180° to respectively achieve right turn and left turn steering of the vehicle.

9. The vehicle steering apparatus of claim 8 wherein the steering means includes a torsion spring for continuously biasing both of the actuators towards their neutral positions and the input control member toward the centered position.

10. The vehicle steering apparatus of claim 1 wherein the first actuator has a first valve actuating cam and the second actuator has a second valve actuating cam, each of the valve actuating cams being rotatable about the central axis and defining a radially outwardly facing cam surface.

11. The vehicle steering apparatus of claim 10 wherein each actuating cam has an inactive portion, a starting ramp portion, and an operating ramp portion.

12. The vehicle steering apparatus of claim 10 wherein each of the radially outwardly facing cam surfaces includes an operating ramp portion extending peripherally through an angular range greater than 180°.

13. The vehicle steering apparatus of claim 12 wherein angular range is about 320°.

14. The vehicle steering apparatus of claim 12 wherein the steering means includes first and second cam-following roller assemblies individually having a roller in engagement with the respective cam surface.

15. The vehicle steering apparatus of claim 14 wherein the steering means includes coupling means for adjustably connecting the cam-following roller assemblies to the respective control valve.

16. The vehicle steering apparatus of claim 14 wherein the steering means includes support means defining a cylindrical bore for supporting each of the cam-follwing roller assemblies in a generally right angle relationship to the central axis.

17. The vehicle steering apparatus of claim 16 wherein the support means includes a pair of identical pillow blocks and means for adjusting the position of the pillow blocks.

18. The vehicle steering apparatus of claim 1 wherein the first actuator includes a shaft and a first cam connected thereto on the central axis, and the second actuator includes a tubular shaft and a second cam connected thereto on the central axis, the cams being juxtaposed.

19. The vehicle steering apparatus of claim 18 wherein the steering means includes a torsion spring operationally acting on the first and second actuators for biasing the input control member to the centered position.

20. The vehicle steering apparatus of claim 19 wherein the steering means includes another torsion spring operationally connected between the cams and being of a smaller torsion rate than the torsion spring.

21. The vehicle steering apparatus of claim 18 wherein the steering means includes means for permitting relatively fine angular adjustment of the cams on the respective shafts.

22. The vehicle steering apparatus of claim 1 wherein the input control member has an actuating member, the first actuator has a first arm, the second actuator has a second arm, and the actuating member is adapted to move one of the first and second arms while the other one remains stationary.

23. The vehicle steering apparatus of claim 1 wherein the control valve means includes a pilot line leading from each one of the control valves to the displacement control of the steering pump for controlled operation thereof, one of the pilot lines being pressurized and the other being a return during steering, and means for reversing the controlled pressurization of the pump displacement control by the pilot lines upon reversing the direction of movement of the vehicle.

24. A vehicle steering apparatus for a vehicle having a steering input control member rotatable about a central axis and a mechanism drivingly connected to left and right ground-engaging members, comprising:
pump and motor means for controllably applying torque to the mechanism for steering the vehicle and including a steering pump and a displacement control for the steering pump;
control valve means for controllably delivering fluid under pressure to the displacement control, the control valve means including a right turn control valve and a left turn control valve in juxtaposed relation; and
steering means for converting the rotational movement of the input control member away from a centered position to linear actuation of a selected one of the control valves, the steering means including an actuating member on the input control member, a first valve actuating cam at one side of the actuating member, a second valve actuating cam at the opposite side of the actuating member, and arm means associated with the respective actuating cams for being contacted by the actuating member for individual rotation of the valve actuating cams about the central axes.

25. The vehicle steering apparatus of claim 24 wherein the steering means includes first means for resiliently biasing the first valve actuating cam to a neutral condition, and second means for resiliently biasing the second valve actuating cam to a neutral condition.

26. The vehicle steering apparatus of claim 25 wherein the first and second means are individual torsion springs.

27. A vehicle steering apparatus for operation of a steering pump having a displacement control associated therewith, comprising:
an input control member rotatable about a central axis in either direction away from a centered position;
a right turn control valve in fluid communication with the displacement control;
a left turn control valve in fluid communication with the displacement control;
a first cam mounted for rotation about the axis in a first direction away from a neutral position;
a second cam mounted for rotation about the axis in a second direction away from a neutral position;
first means for rotating the first cam through a first angular range and the second cam through a second angular range in response to rotation of the input control member; and
second means for converting rotation of the first and second cams to linear actuation of the right turn and left turn control valves and operating the displacement control.

28. The vehicle steering apparatus of claim 27 incuding a steering wheel and wherein the input control member is directly responsive to rotation of a steering wheel.

29. The vehicle steering apparatus of claim 27 including resilient means for biasing the cams towards their respective neutral positions.

30. The vehicle steering apparatus of claim 27 wherein the first and second angular ranges are each greater than 180°.

31. The vehicle steering apparatus of claim 27 wherein the first and second angular ranges are each approximately 320°.

32. The vehicle steering apparatus of claim 29 wherein the second means includes first and second roller assemblies capable of the following the respective cams.

33. The vehicle steering apparatus of claim 32 including a torsion spring for biasing both of the cams towards their neutral positions, and the input control member toward the centered position.

34. The vehicle steering apparatus of claim 27 including a first torsion spring for biasing the first cam to the neutral position and a second torsion spring for biasing the second cam to the neutral position.

35. The vehicle steering apparatus of claim 27 including means for reversing the fluid communication between the pump displacement control and the right and left turn control valves in response to reversing the direction of movement of the vehicle.

36. The vehicle steering apparatus of claim 27 wherein each of the control valves includes a depressible actuating portion displaceable by the second means, a control spool portion responsive to movement of the actuating portion, and a pilot line communicating between the control spool portion and the displacement control.

37. The vehicle steering apparatus of claim 36 including a diverter valve for reversing the connections of the pilot lines to the displacement control, and means for actuating the diverter valve upon reversing the direction of movement of the vehicle.

38. A vehicle steering apparatus for converting the rotational movement of an input control member about an axis to hydraulic operation of a displacement control for a steering pump, comprising:
a right turn control valve in fluid communication with the displacement control;
a left turn control valve in fluid communication with the displacement control;
a first actuator mounted for rotation in a first direction about the axis away from a neutral position and being operatively connected to the right turn control valve;

a second actuator mounted for rotation in a second direction about the axis away from a neutral position and being operatively connected to the left turn control valve;

first means for resiliently biasing the actuators towards their respective neutral positions; and second means for rotating the first actuator in the first direction through a first angular range and for rotating the second actuator in the second direction through a second angular range in response to rotation of the input control member in the first and second directions respectively against the reaction of the first means, the sum of the first and second angular ranges being greater than 360°.

39. The vehicle steering apparatus of claim 38 wherein the first means includes a torsion spring connected between the actuators.

40. The vehicle steering apparatus of claim 38 wherein the first means includes a housing assembly and first and second torsion springs connected between the respective actuators and the housing assembly.

41. The vehicle steering apparatus of claim 38 wherein the first actuator has a first cam and the second actuator has a second cam adjacent the first cam on the axis.

42. The vehicle steering apparatus of claim 41 including a first cam-following roller assembly operatively connecting the first cam and right turn control valve for linear actuation thereof and a second cam-following roller assembly operatively connecting the second cam and the left turn control valve for linear actuation thereof.

* * * * *